(12) United States Patent
Straubhaar

(10) Patent No.: US 8,760,837 B2
(45) Date of Patent: Jun. 24, 2014

(54) METHOD AND APPARATUS FOR MONITORING AND MITIGATING STRAY ELECTRICAL ENERGY

(76) Inventor: Jesse Straubhaar, Blue Mounds, WI (US)

( * ) Notice: Subject to any disclaimer, the term of this patent is extended or adjusted under 35 U.S.C. 154(b) by 425 days.

(21) Appl. No.: 13/161,694

(22) Filed: Jun. 16, 2011

(65) Prior Publication Data

US 2011/0308472 A1   Dec. 22, 2011

Related U.S. Application Data

(60) Provisional application No. 61/355,353, filed on Jun. 16, 2010.

(51) Int. Cl.
*H02H 1/00*   (2006.01)
(52) U.S. Cl.
USPC .......................................................... 361/212

(58) Field of Classification Search
USPC ................. 361/1, 220, 212, 86; 307/326, 327
See application file for complete search history.

(56) References Cited

U.S. PATENT DOCUMENTS

| 4,816,956 | A | * | 3/1989 | Hertz et al. ..................... 361/42 |
| 5,321,318 | A | * | 6/1994 | Montreuil ..................... 307/326 |
| 5,793,591 | A | * | 8/1998 | Summerer et al. .............. 361/86 |
| 7,394,259 | B2 | * | 7/2008 | Fitzgerald ..................... 324/522 |
| 7,405,670 | B2 | * | 7/2008 | Fitzgerald ..................... 340/606 |

* cited by examiner

*Primary Examiner* — Yvonne Abbott
(74) *Attorney, Agent, or Firm* — Boyle Fredrickson, S.C.

(57) ABSTRACT

A system and method for monitoring and mitigating leakage currents. The data acquisition system records data from multiple monitoring locations over extended periods of time to identify stray voltage and/or leakage currents present at the monitoring location. The data is processed to identify trends in the stray voltage and/or leakage currents and to suggest methods for mitigating the same.

9 Claims, 4 Drawing Sheets

METHOD AND APPARATUS FOR MONITORING AND MITIGATING STRAY ELECTRICAL ENERGY

CROSS-REFERENCE TO RELATED APPLICATIONS

This application claims priority from U.S. Provisional Patent Application Ser. No. 61/355,353 filed on Jun. 16, 2010, the entirety of which is expressly incorporated by reference herein.

FIELD OF THE INVENTION

The subject matter disclosed herein relates generally to monitoring stray electrical energy, such as stray voltage and leakage currents, and in particular, to a method of monitoring and recording stray electrical energy over a large region to identify and mitigate the stray electrical energy.

BACKGROUND AND SUMMARY OF THE INVENTION

Stray electrical energy is often identified as "stray voltage." Stray voltages describe voltages that exist between two objects that should not have a voltage difference between them. Stray voltages may be produced, for example, by improper grounding of electrical equipment, unbalanced multi-phase electrical equipment such as motors, generators, and transformers, or defective equipment. Electrical devices typically include a ground wire which is often connected to a metal rod, water pipe, or other conductive member extending into the ground. Ideally, the ground conductor remains at a zero voltage potential. However, if any of the above-mentioned conditions exist, there is the possibility of a voltage potential existing on the ground conductor and being passed into the ground.

Stray electrical energy may also be identified as "leakage current." Leakage currents exist, for example, when current unexpectedly flows along an unintended conductive path. Deterioration or failure of an electrical device may create the unintended conduction. Alternately, electromagnetic coupling of radiated energy may establish current flow in electrical conductors. Unintended conduction also occurs, for example, due to non-ideal behavior of electrical components such as diodes, transistors, and capacitors.

The modern farm presents one environment in which stray electrical energy is of interest. Farms typically require a significant amount of electrical equipment, such as ventilation fans, water pumps, and specialized equipment, for example, milking machines on dairy farms. The electrical equipment may be spread out across several buildings and is often present in a dirty and wet environment. The harsh environment has the potential for excessive wear, corrosion, and/or failure of the electrical equipment. Prior to failure of electrical equipment, the equipment may operate in a state which introduces stray voltage and/or leakage currents onto ground conductors.

Although the stray electrical energy is typically imperceptible to humans or animals, it is possible that stray electrical energy of sufficient amplitude may exist to be felt by or cause irritation to humans or to the animals. Stray electrical energy may travel between buildings and aggregate from multiple buildings to create a potentially unsafe or unpleasant environment. For example, animal water tanks are often metallic. Further, the water tanks may be fed by water pumped from a central source or from a well and carried through metal pipes. Stray electrical energy may be conducted through the water, pumps, pipes, water tanks, or a combination thereof into the animals. The effects of the stray electrical energy on animals have been reported to range from a minor irritation to causing sickness or death of an animal. Accurate measuring and recording of stray electrical energy can help in mitigating this energy.

Typically, stray electrical energy is monitored by measuring stray voltage. Stray voltages on farms have typically been measured at specific points using a voltmeter with a 500 ohm resistor in parallel to the leads from the voltmeter. A first lead is then connected to, or inserted into, the ground and a second lead is connected to the point at which the stray voltage is to be measured, such as a water tank, metal pipe, or metal structural element. The 500 ohm resistance is selected as it is believed to simulate the resistance through a cow's body.

However, measuring stray voltage in this manner is not without its drawbacks. Readings of stray voltage are typically taken at a single point. The reading may be affected by many variables, including loading of the electrical system or humidity. Further, the single reading captures the stray voltage at only a single instant and fails to capture trends or peak values of the stray voltage. Additionally, measurements of leakage current may provide more relevant information about the level of stray electrical energy present than measurements of stray voltage. A high level of voltage with a low current, may present little danger, while a relatively low level of voltage with a high current may present a significant danger.

Therefore, it is a primary object and feature of the present invention to provide an improved method of measuring and recording stray electrical energy, especially over a significant geographical region, to identify areas of interest having higher levels of stray voltage and/or leakage current and to minimize the level of stray electrical energy in the identified areas.

In accordance with the present invention, a system for reducing stray electrical energy over a geographical region includes a plurality of sensing devices positioned within the geographical region, a data acquisition device, and at least one stray electrical energy mitigation device. Each sensing device includes a sensor generating a signal corresponding to the amplitude of stray electrical energy present at a location of the sensing device, and a communication port transmitting the signal. The data acquisition device includes at least one input configured to receive the signals from the sensing devices, and at least one memory device configured to store the signals from the sensing devices. A processor is configured to execute a stored program to compile the signals over the geographical region for a preselected time period, which may be 6 months or longer, and to identify at least one pattern of emission of the stray electrical energy over the period of time. At least one stray electrical energy mitigation device is positioned within the geographical region as a function of the pattern of emission of the stray electrical energy. The at least one stray electrical energy mitigation device may be selected from a dual holding tank system connected in series with a supply line, a multi-layer, electrically isolated supply line, a pump connected in series with the supply line to modify water flow between a water supply and a water tank, and an electrical insulator positioned between the water tank and a surface on which the tank is placed.

In accordance with another aspect of the present invention, at least one of the signals corresponding to the amplitude of stray electrical energy measures the amplitude of a leakage current at a resolution finer than 30 milliamps. Optionally, the resolution is selected between 50 microamps and 1 milliamp.

In accordance with yet another aspect of the present invention, multiple sensing devices positioned within the geographical region generate signals corresponding to an environmental condition within the geographical region, and the data acquisition device stores each of the plurality of signals corresponding to the environmental condition in the memory device over the period of time. The processor is further configured to execute the stored program to correlate the pattern of the emission of stray electrical energy to the signals corresponding to the environmental condition.

In accordance with another embodiment of the present invention, an animal watering system with improved electrical isolation includes a water supply, a supply line in fluid communication with the water supply, a water tank configured to deliver water to at least one animal and in fluid communication with the supply line, and at least one electrical isolation means operatively located proximate to one of the water supply, the supply line, and the water tank to mitigate stray electrical energy. The electrical isolation means may further include a fill valve having an input in fluid communication with the supply line and an output in fluid communication with a first holding tank. The first holding tank is operatively connected to the output of the fill valve, and the fill valve selectively establishes fluid communication between the supply line and the first holding tank. A coupling valve has an input operatively connected to the first holding tank and an output operatively connected to a second holding tank. The coupling valve selectively establishes fluid communication between the first holding tank and the second holding tank. An exit valve has an input operatively connected to the second holding tank and an output in fluid communication with the water tank. The exit valve selectively establishes fluid communication between the second holding tank and the water tank. The animal watering system may further include a first gasket positioned between the coupling valve and either the first holding tank and the second holding tank. The animal watering system may similarly include a second gasket positioned between the coupling valve and the other holding tank. Each of the gaskets is made of a non-conductive material.

In accordance with another aspect of the invention, the animal watering system also includes a data acquisition device and multiple sensing devices positioned within the geographical region. The data acquisition device includes at least one memory device configured to receive a plurality of signals corresponding to an amplitude of stray electrical energy and a processor configured to execute a stored program. Each sensing device includes a sensor generating one of the signals corresponding to the amplitude of stray electrical energy present at a location of the sensing device and a communication port transmitting the signal to the data acquisition device. The processor executes to compile the signals over the geographical region for a preselected time period, and the electrical isolation means is selected as a function of the compiled signals In accordance with still another aspect of the invention, the electrical isolation means may be a supply line with multilayer construction. The multilayer construction includes an internal pipe having an inner periphery and an outer periphery, an electrically conductive layer adjacent to the outer periphery of the internal pipe, and an external layer substantially covering the electrically conductive layer. The electrical isolation means may also include a pump connected in series with the supply line to periodically interrupt the water flow and inject an air pocket in the supply line. Optionally, the electrical isolation means may further include a nozzle operatively connected between an output of the supply line and the water tank.

In accordance with yet another embodiment of the present invention, a method of monitoring stray electrical energy over a plurality of locations obtains signals corresponding to an amplitude of stray electrical energy at a plurality of locations with a sensing device. The signals are transmitted from each of the plurality of locations to a data acquisition device, and analyzed to identify at least one pattern of stray electrical energy. The stray electrical energy is mitigated as a function of the pattern of stray electrical energy.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
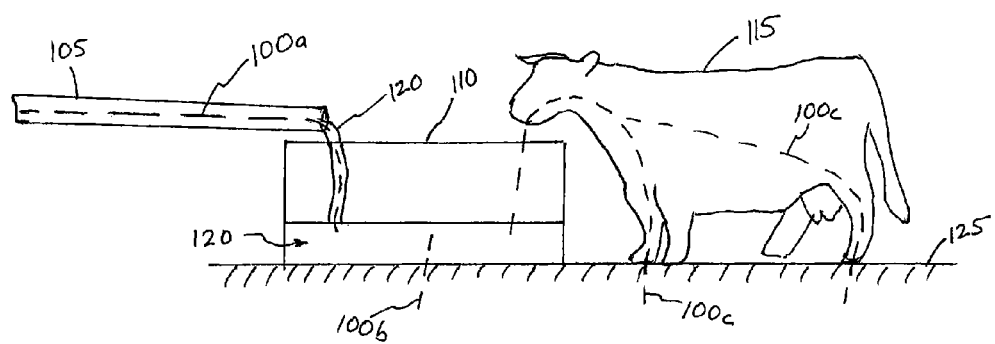
FIG. 1 is an exemplary environmental view illustrating electrical conduction paths of leakage current from a water pipe through a water tank and to an animal.

Referring to FIG. 1, an exemplary environmental view illustrates electrical conduction paths 100a-100c of leakage current from a water pipe 105 through a water tank 110 and to an animal 115. Typically, the water pipe 105 and water tank 110 are made of metal and are, therefore, electrically conductive. Water 120 is also electrically conductive. Consequently, if water 120 is flowing from the water pipe 105 into the water tank 110, a conduction path 100a is established from the water pipe 105 into the water tank 110. If an animal 115 drinks from the water tank 110 as water 120 is flowing from the water pipe 105, another conduction path 100c is established from the water tank 110 through the animal 115 to ground 125. Additionally, the water tank 110 is commonly resting directly on the ground 125. Therefore, still another conduction path 100b may exist from the water 120 through the tank 110 and into the ground 125. When an animal 115 drinks from the water tank 110 a complete circuit is formed by the conduction path 100c returning current to the ground 125. Thus, an animal 115 drinking from a water tank 110 in an environment which includes stray voltages and/or leakage currents, may be susceptible to creating a conduction path through the animal's 115 body when drinking from the water tank 110.

Figure 2:
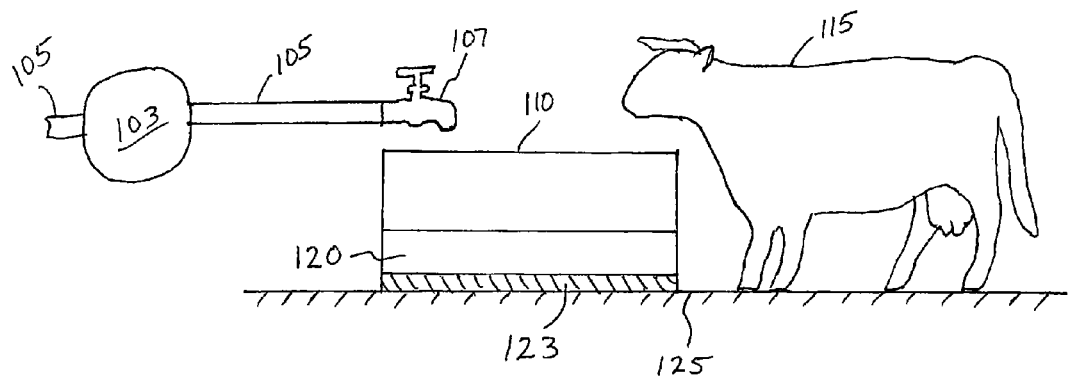
FIG. 2 is an exemplary environmental view illustrating isolation of a water tank from ground.

Referring to FIG. 2, an improved watering system may employ one or more options for isolating the water tank 110 from the ground 125 to prevent the electrical conduction paths 100 of FIG. 1. As a first option, a pump 103 may be operatively connected to the water pipe 105 to periodically inject an air pocket into the water 120 flowing through the water pipe 105. This air pocket creates a discontinuity in the water flow, electrically separating segments of the water flow from each other to prevent the water 120 from conducting stray electrical energy to the water tank 110. As another option, a nozzle 107 may be operatively connected to the output of the water pipe 105 to increase the electrical impedance of the water flow, thereby reducing the magnitude of leakage current in the conduction path 100a. As still another option, an insulator 123 may be positioned between the water tank 110 and the ground 125 preventing a conduction path 100b from being established between the water tank 110 and the ground 125. It is contemplated that one or more of these options may be implemented to reduce conduction of stray electrical energy according to the application requirements.

Figure 3:
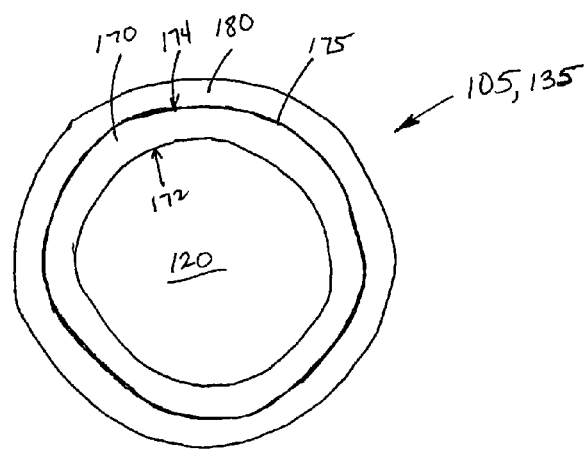
FIG. 3 is a cross-sectional view of a water pipe which may be electrically isolated for use in an exemplary animal watering system according to the present invention.
Figure 4:
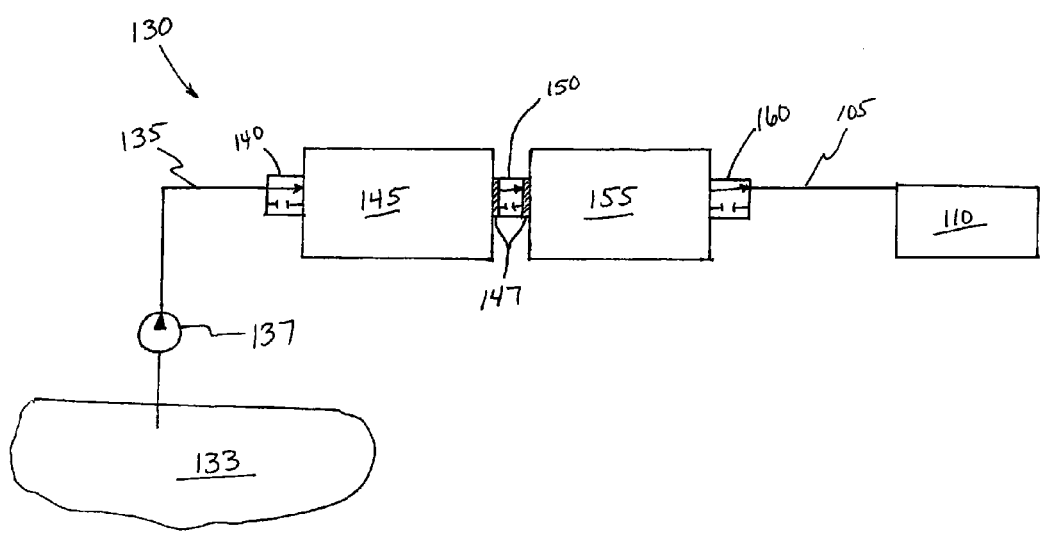
FIG. 4 is a block diagram representation of an exemplary animal watering system according to the present invention.

Referring next to FIG. 4, capacitive coupling is one method by which the stray electrical energy enters the animal watering system 130. Capacitive coupling may be reduced by electrically isolating one or more of the water pipes, 105 or 135. Referring also to FIG. 3, the water pipe may be constructed with multiple layers. The internal pipe 170 may be of traditional construction including, but not limited to, copper or polyvinyl chloride (PVC). The internal pipe 170 has an inner periphery 172 through which the water flows and an outer periphery 174. An intermediate layer 175 is, for example, wound around or slid on the outer periphery 174 of the internal pipe 170. The intermediate layer 175 is preferably electrically conductive and may be copper pipe or mesh. An electrical connection to the intermediate layer 175 may be made based on the nature of stray electrical energy present in the system and on site requirements. The electrical connection is preferably made to provide the smallest leakage current. The connection to the intermediate layer 175 may be, but is not limited to, connection to an appropriate neutral, ground, or other point in the animal watering system 130, either directly or via an appropriate resistive, inductive, or capacitive element. An external layer 180 protects the intermediate layer 175 and may be any suitable material, including another pipe or an insulating layer.

Referring again to FIG. 4, one embodiment of an improved animal watering system 130 is illustrated. The animal watering system 130 has a dual-tank construction to prevent electrical conduction from a water supply 133, such as a well or a municipal water supply, to the water tank 110. A pump 137 draws water from the water supply 133 and creates a flow path via a supply line 135 to a first holding tank 145. A fill valve 140 is connected between the supply line 135 and the first holding tank 145. The fill valve 140 preferably has a first position, closing the flow path between the water supply 133 and the first holding tank 145, and a second position, establishing the flow path between the water supply 133 and the first holding tank 145. Alternately, the fill valve 140 may be a variable position valve to continuously vary the flow rate of water between the water supply 133 and the first holding tank 145 from the off position to a fully on position.

A coupling valve 150 connects the first holding tank 145 to the second holding tank 155. The coupling valve 150 preferably has a first position, closing the flow path between the first holding tank 145 and the second holding tank 155, and a second position, establishing the flow path between the first holding tank 145 and the second holding tank 155. Alternately, the coupling valve 150 may be a variable position valve to continuously vary the flow rate of water between the first holding tank 145 and the second holding tank 155 from the off position to a fully on position. Preferably, a gasket or sealing member 147 is positioned between the coupling valve 150 and either one or both of the first and second holding tanks, 145 and 155 respectively. The gasket 147 may aid in sealing the connection between the coupling valve 150 and each holding tank, 145 and 155. In addition, the gasket 147 is preferably made of a non-conductive material such as rubber or nylon to prevent electrical conduction between the first holding tank 145 and the second holding tank 155. Alternately, a gasket 147 may be integrally formed in the coupling valve 150 or the coupling valve 150 may be constructed of a non-conductive material.

The first holding tank 145 and the second holding tank 155 are preferably positioned as near each other as possible while minimizing the capacitive coupling between the two tanks, which is capable of conducting leakage currents. Consequently, the coupling valve 150 preferably directly connects the first holding tank 145 and the second holding tank 155. Optionally, one or more segments of pipe (not shown) may be included between the first holding tank 145 and the coupling valve 150 or between the second holding tank 155 and the coupling valve 150 to facilitate coupling the first and second holding tanks, 145 and 155, respectively.

An exit valve 160 connects the second holding tank 155 to the water pipe 105. The exit valve 160 preferably has a first position, closing the flow path between the second holding tank 155 and the water pipe 105, and a second position, establishing the flow path between the second holding tank 155 and the water pipe 105. Alternately, the exit valve 160 may be a variable position valve to continuously vary the flow rate of water between the second holding tank 155 and the water pipe 105 from the off position to a fully on position. The water pipe 105 delivers the water 120 to the water tank 110.

In operation, the improved animal watering system 130, as illustrated in FIG. 4, is operated to maintain separation between the water supply 133 and the water in the water tank 110. The fill valve 140, coupling valve 150, and the exit valve 160 are preferably controlled such that at least one of the valves is always in the closed position. Water may enter the first holding tank 145 by opening the fill valve 140. Water is then transferred from the first holding tank 145 to the second holding tank 155 by opening the coupling valve 150. Prior to opening the exit valve 160, either the fill valve 140 or the coupling valve 150 is closed. For example, the fill valve 140 may close, permitting water to flow from the first holding tank 145 to the second holding tank 155 as well as from the second holding tank 155 to the water tank 110. Alternately, the coupling valve 150 may be closed, permitting the first holding tank 145 to be filled from the water supply while the water tank 110 is filled from the second holding tank 155. Keeping one of the valves in a closed position prevents an electrical conduction path from being established through the water flowing from the water supply 133 to the water 120 in the water tank 110.

Figure 5:
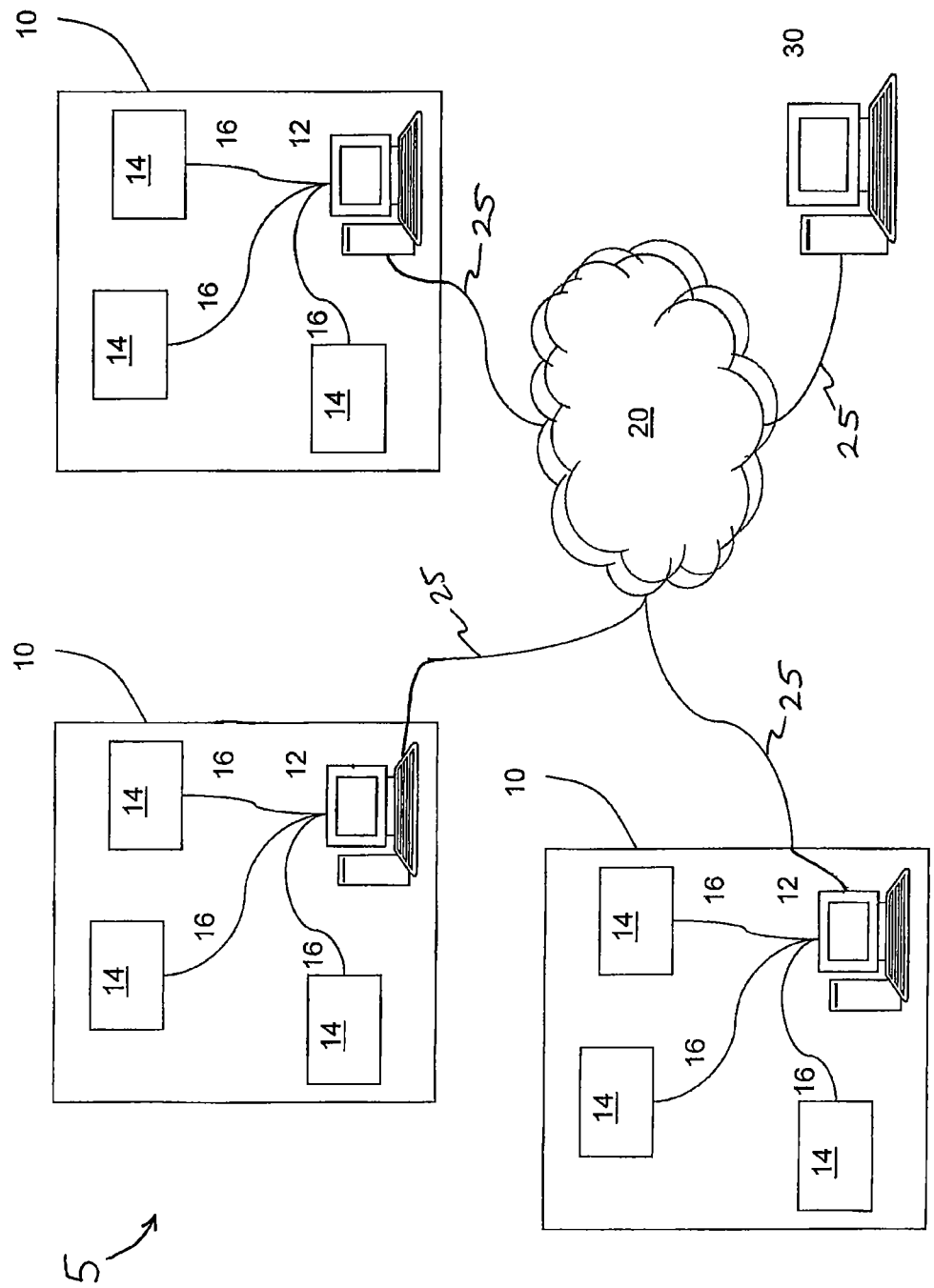
FIG. 5 is a block diagram representation of an exemplary system to measure and identify stray voltages according to the present invention.
Figure 6:
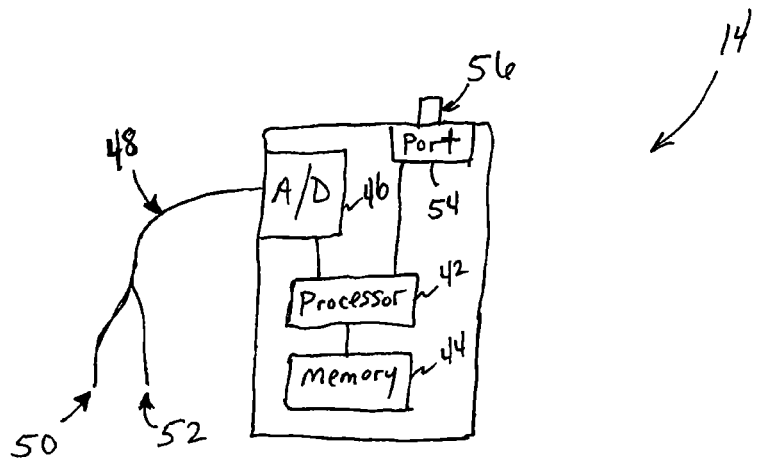
FIG. 6 is a block diagram representation of a sensing device according to FIG. 5.
Figure 7:
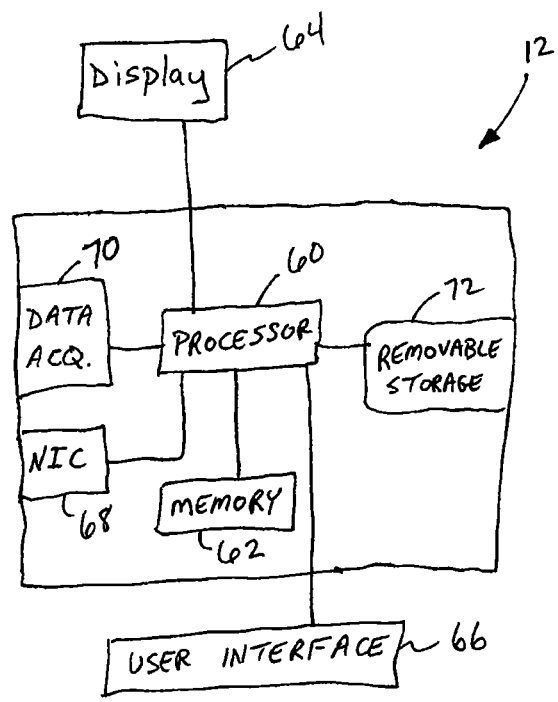
FIG. 7 is a block diagram representation of a data acquisition device according to FIG. 5.

In order to identify the stray voltage and/or leakage currents, an improved data acquisition system 5 is disclosed. Referring to FIGS. 5-7, the data acquisition system 5 includes at least one monitoring location 10 which preferably includes a data acquisition device 12 connecting to at least one sensing device 14. The data acquisition device 12 may be, but is not limited to, a computer having a data acquisition board 70 mounted to one of the slots of the motherboard. The data acquisition board 70 may be configured to receive signals directly via wired or wireless communications. For example, one or more data ports may be mounted on the data acquisition board 70 and connected to each sensing device 14, for example, by an appropriate electrical conductor 16 or using wireless communications. Optionally, the data acquisition board 70 may be configured to receive these signals via any other network interface card (NIC) 68 incorporated within the data acquisition device 12. According to one embodiment of the invention, the data acquisition device 12 includes a user interface 66, such as a mouse, keyboard, or touch screen, for receiving input from an operator and a display 64 for displaying data to the operator. According to another embodiment of the invention, the data acquisition device 12 may include a wireless interface for communication to a remote device, not shown. An operator may then interface with the remote device to either provide input to or view data from the data acquisition device 12. The remote device may include, but is not limited to, a dedicated receiver, a portable electronic device, such as a personal digital assistant, a smart phone, or a tablet computer, or another electronic device, such as a desktop computer or central server housed within a local or a remote building. The data acquisition device 12 also includes a memory device 62 and a processor 60 in communication with the memory device 62. The processor 60 is configured to execute a program stored in the memory device 62 and stores the signals received from the sensing devices in the memory device 62. It is contemplated that one or more of the processor 60, memory device 62, data acquisition board 70, and network interface card 68 may be incorporated onto a single application specific integrated circuit (ASIC) or field programmable gate array (FPGA). Similarly, portions of each of the processor 60, memory device 62, data acquisition board 70, and network interface card 68 may be separated and executed independently or in a coordinated manner on multiple devices as would be known in the art.

Each sensing device 14 may be, but is not limited to, a probe 48, which includes a pair of leads, 50 and 52, connected in parallel to measure voltage or in series to measure current. For example, a first lead 50 may be connected to or embedded into the ground at a first point and a second lead 52 connected to a conductive surface at a second point remote from the first point. The pair of leads, 50 and 52, measures the amplitude of the desired voltage or current and transmits the signal via an analog to digital converter 46 to a processor 42 within the sensing device 14. The processor 42 on the sensing device 14 may temporarily store the signal in the memory device 44 or directly transfer the signal to a communication port 54 for transmission to the data acquisition device 12. The communication port 54 may be connected by a suitable electrical conductor 16 or by an antenna 56 to wirelessly transmit the signals to the data acquisition device 12. It is contemplated that one or more of the processor 42, memory device 44, analog to digital converter 46, and communication port 54 may be incorporated onto a single application specific integrated circuit (ASIC) or field programmable gate array (FPGA). Similarly, portions of each of the processor 42, memory device 44, analog to digital converter 46, and communication port 54 may be separated and executed independently or in a coordinated manner on multiple devices as would be known in the art.

Similarly, a first lead 50 may be connected at a first point within a conduction path and a second lead 52 connected at a second point within a conduction path such that the pair of leads, 50 and 52, is connected in series with the conduction path. The conduction path may be configured to include a conducting material and the current flowing through the conducting material is thereby measured. Alternately, the conduction path may be a coil positioned about a conducting material and the field induced in the coil by the current flowing through the conducting material is measured. For example, a Rogowski coil may be positioned about a water pipe to measure currents flowing through the water pipe. A Rogowski coil is an electrical device for measuring alternating current, including a helical coil with the lead from one end returning through the center of the coil such that both leads are at one end of the coil. Optionally, a current sensor using flux gate technology may be employed. It is contemplated that other suitable sensing devices 14 as would be known in the art may be used to measure stray voltages and/or leakage currents at varying points within the monitoring location 10.

The sensing devices 14 are configured to precisely measure signals having small amplitudes as is consistent with stray voltages and leakage currents. Although typical ground fault detectors have a threshold of 30 milliamps, leakage currents as small as 1 milliamp may cause irritation to an animal 115. Thus, a current sensing device preferably measures leakage currents with a resolution of 50 microamperes or better. Because stray electrical energy may be introduced into the sensor via an electrical power connection to the utility grid, the sensing device 14 may be remotely powered, for example, by a battery or a photovoltaic cell connected to the sensing device 14. Similarly, an electrical conductor 16 providing the measured signal to the data acquisition device 12 may receive and conduct stray electrical energy. Thus, transmission of the signal via wireless communication may further improve precision of the sensing device 14.

The data acquisition device 12 is configured to collect the incoming signals from the sensing devices 14. The data acquisition device 12 may be configured to measure voltage, current, or selectively measure either voltage or current. The data acquisition device 12 measures a range of frequencies for the incoming signals. The incoming signals may include components at one or more frequencies, such as a direct current (DC) component at zero Hertz (0 Hz), a utility voltage or current component at sixty Hertz (60 Hz), a higher frequency component such as a one kilohertz (1 kHz) signal, or components at other frequencies within the sweep range of the data acquisition device 12. The data acquisition device 12 may be configured to process, either digitally or by analog components, the incoming signals to obtain data across a desired frequency band. Each signal may be acquired at a predetermined periodic interval or, optionally, the data acquisition device 12 may be configured to read each signal if the signal reaches or exceeds a predetermined threshold. It is further contemplated that additional signals may be measured by suitable sensing devices 14, including, but not limited to, electric field strength, temperature, wind speed, humidity, rain fall amounts, or other environmental variables that may affect the levels of stray voltage and leakage currents.

The sensing devices 14 may be positioned to measure signals at loads distributed about the monitoring location 10, at the connection to the utility grid, or a combination thereof.

If the monitoring location 10 is, for example, a farm, the loads distributed about the monitoring location may include, but are not limited to, fans, pumps, or specialized farm processing equipment requiring either single or multi-phase power. Signals measured at the connection to the utility grid may include, but are not limited to, the voltages and/or currents in one or more of the phases of electrical power entering the farm.

The data acquisition device 12 stores the digital signals on the memory device 62. The digital signals are preferably stored on the memory device 62 in data files suitable for importation into a spreadsheet or other graphing applications. The memory device 62 is sized to store signals over a long period of time, for example months or years. Optionally, the data acquisition device 12 may be configured to periodically transmit stored data to a central processing device 30 or to copy the stored data to a removable storage medium 72 such as a CD-ROM, DVD-ROM, USB storage device, or other such storage device. Once stored data has been transmitted or copied, the memory device 62 may be cleared to accept new data.

The data acquisition system 5 is also configured to process the incoming signals from the sensing devices 14. Processing of the incoming signals may occur either at the data acquisition device 12, at a central processing device 30, or at a combination thereof. The central processing device 30 is preferably connected to the data acquisition device 12 at each monitoring location 10 by a network 20, such as the Internet, and network connections 25, which may utilize any suitable wired or wireless network infrastructure. Data from multiple monitoring locations 10 may be compiled at a central processing device 30 for analysis.

In operation, the data acquisition system 5 is configured to record and evaluate stray voltages and/or leakage currents over an extended period of time and over a broad geographical region. A significant number of factors, many varying over time, may influence stray voltage and leakage currents. Thus, it is desirable to record and analyze stray voltages and leakage currents over time rather than recording individual readings at a single instant in time.

The measurements made at the connection to the utility grid may be used to identify faults in the transmission lines, such as ground faults, or if the electrical phases of the incoming power are unbalanced. It is possible for an imbalance or a ground fault in the utility grid supplying power to the monitoring location 10 to produce additional stray voltages or leakage currents. In addition, the measurements at the connection to the utility grid may further be used to monitor energy consumption.

The data acquisition system 5 is configured to analyze the recorded data. The data acquisition device 12 preferably operates continuously, measuring signals at predefined intervals or if a signal exceeds a predefined threshold. Sensing devices 14 preferably measure electrical signals at varying points as well as environmental variables within the monitoring location 10. The data acquisition system preferably also has knowledge of the electrical equipment or electrical loads that are active within the monitoring location 10. Thus, levels of the stray voltages or leakage currents may be analyzed to identify trends related to operation of specific equipment. Further, interactions between different equipment or varying power requirements may also be identified.

The central processing device 30 is further configured to analyze data from individual monitoring locations 10 or a combination of monitoring locations 10. The central processing device 30 may request data to be transmitted over the network 20 from a specific monitoring location 10 or each monitoring location 10 may be configured to periodically transmit data to the central processing device 30. By analyzing multiple monitoring locations 10, the central processing device 30 identifies trends in stray voltage or leakage current over a broad geographical region. Further, interactions between the levels of stray voltage or leakage current and the power requirements of different monitoring locations may be identified. It is also contemplated that the central processing device 30 may access topographical data, for example from a local file or database or from an online service, such as GOOGLE® map, to identify topographical features, including, but not limited to, roads, rivers, hills, trees, fields, and structures. Using the topographical features, the central processing device 30 may identify patterns in stray voltage or leakage current that correspond to different topographical features.

The central processing device 30 may be also be configured to trend stray voltage or leakage current over extended periods of time. Because the data acquisition device 12 preferably operates continuously, data may be analyzed, for example, daily, weekly, over a given season, annually, or over any other desired time interval to identify patterns in stray voltage or leakage current during the specified period of time. As still another aspect of the invention, the central processing device 30 may filter the data signals to identify, for example, DC signals, AC signals, or harmonic components of AC signals.

Having analyzed the stray voltages or leakage currents from the monitoring locations 10, it is desirable to minimize these stray voltages and leakage currents. An improved animal watering system 130, as described above, may be used to reduce stray voltages present in an animal watering tank. Optionally, a conductive material may be positioned for example in a ring around equipment that creates an increased level of stray voltage or leakage current or around equipment that may be sensitive to increased levels of stray voltage or leakage current. Similarly, analysis of the recorded data may identify conduction paths or interactions between equipment that may be disrupted by appropriate grounding and/or guarding. The conductive material may be positioned for example in a ring along the earth's surface to surround a specific transmission line, building, or other conductive path.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A system for reducing stray electrical energy over a geographical region, comprising:
   a plurality of sensing devices positioned within the geographical region further comprising:
     a sensor generating a signal corresponding to an amplitude of stray electrical energy present at a location of the sensing device, and
     a communication port configured to transmit the signal;
   a data acquisition device further comprising:
     at least one input configured to receive the signals from the sensing devices, at least one memory device configured to store the signals from the sensing devices, and a processor configured to execute a stored program to compile the signals over the geographical region for a preselected time period and to identify at least one pattern of emission of the stray electrical energy over the time period; and at least one stray electrical energy mitigation device positioned within the geographical region as a function of the pattern of emission of the stray electrical energy.

2. The system for reducing stray electrical energy of claim 1 wherein at least one of the signals corresponding to the amplitude of stray electrical energy measures the amplitude of a leakage current at a resolution finer than 30 milliamps.

3. The system for reducing stray electrical energy of claim 2 wherein the resolution of the signal is about 50 microamps to 1 milliamp.

4. The system for reducing stray electrical energy of claim 1 wherein the period of time is at least 6 months.

5. The system for reducing stray electrical energy of claim 1 further comprising a plurality of sensing devices positioned within the geographical region which generate signals corresponding to an environmental condition within the geographical region.

6. The system for reducing stray electrical energy of claim 5 wherein the data acquisition device stores each of the plurality of signals corresponding to the environmental condition in the memory device over the period of time and the processor is further configured to execute the stored program to correlate the pattern of the emission of stray electrical energy to the signals corresponding to the environmental condition.

7. The system for reducing stray electrical energy of claim 1 wherein the at least one stray electrical energy mitigation device reduces stray electrical energy within an animal watering system and is selected from at least one of a dual holding tank system connected in series with a supply line, a multi-layer, electrically isolated supply line, a pump connected in series with the supply line to modify water flow between a water supply and a water tank, and an electrical insulator positioned between the water tank and a surface on which the tank is placed.

8. A method of monitoring stray electrical energy over a plurality of locations, comprising:

obtaining signals corresponding to an amplitude of stray electrical energy at a plurality of locations with a sensing device;

transmitting the signals from each of the plurality of locations to a data acquisition device;

analyzing the signals from the plurality of locations to identify at least one pattern of stray electrical energy; and mitigating the stray electrical energy as a function of the pattern of stray electrical energy.

9. The method of claim 8 wherein mitigating the stray electrical energy further comprises selecting at least one stray electrical energy mitigation device from one of a dual holding tank system connected in series with the supply line, a multi-layer, electrically isolated supply line, a pump connected in series with the supply line modifying water flow between the water supply and the water tank, and an electrical insulator positioned between the water tank and a surface on which the tank is placed.

* * * * *